United States Patent [19]

Suga

[11] Patent Number: 5,606,321
[45] Date of Patent: Feb. 25, 1997

[54] SIGNAL-PROCESSING CIRCUIT

[75] Inventor: Kazuyuki Suga, Tokyo, Japan

[73] Assignee: Sharp Kabushiki Kaisha, Osaka, Japan

[21] Appl. No.: 440,483

[22] Filed: May 12, 1995

[30] Foreign Application Priority Data

Jun. 22, 1994 [JP] Japan ..................... 6-140103

[51] Int. Cl.$^6$ ................... H03M 1/46
[52] U.S. Cl. .................... 341/161; 341/155; 341/158
[58] Field of Search ..................... 341/155, 161, 341/158; 348/245

[56] References Cited

U.S. PATENT DOCUMENTS 4,503,467  3/1985  Ida et al. .......................... 358/212
4,583,223  4/1986  Inoue et al. ........................ 371/20

FOREIGN PATENT DOCUMENTS 3-108867  5/1991  Japan .

Primary Examiner—Jeffery A. Gaffin
Assistant Examiner—Jason H. Vick
Attorney, Agent, or Firm—David G. Conlin; Brian L. Michaelis

[57] ABSTRACT

A signal-processing circuit has the first reference-voltage setting circuit for setting a lower-limit reference voltage and an upper-limit reference voltage for the first A/D converter, a data-storing section for storing digital data obtained by the first A/D converter, and the second reference-voltage setting circuit for setting a lower-limit reference voltage for the second A/D converter to a voltage that is lower than the voltage corresponding to the digital data stored in the data-storing section and that is higher than the lower-limit reference voltage set by the first reference-voltage setting circuit, as well as for setting an upper-limit reference voltage for the second A/D converter to a voltage that is higher than the voltage corresponding to the digital data stored in the data-storing section and that is lower than the upper-limit reference voltage set by the first reference-voltage setting circuit. Thus, the signal-processing circuit releases digital data based on the data obtained by the second A/D converter. This arrangement makes it possible to convert the analog data released from the line sensor into digital data at high speeds with high resolution and release the resulting data.

6 Claims, 5 Drawing Sheets

SIGNAL-PROCESSING CIRCUIT

FIELD OF THE INVENTION

The present invention relates to an image-inputting apparatus, and more specifically concerns a signal-processing circuit that converts analog voltages obtained by reading a document by using a line sensor into digital data and releases the data.

BACKGROUND OF THE INVENTION

As shown in FIG. 4, an image-inputting apparatus, which is used in facsimiles, digital copying machines, scanners and other apparatuses, is provided with a line sensor 51 for reading an original document 50. The line sensor 51 has a construction wherein light-receiving elements are aligned in a straight-line shape.

Light, reflected from the original document 50, is focused on the light-receiving elements in the line sensor 51 by a lens 49, and analog signals, which have respective levels corresponding to the quantities of light received by the light-receiving elements, are released from the line sensor 51 as a serial signal. Here, it is possible to read the entire portion of the original document 50 by shifting the line sensor 51 or the original document 50.

The analog signals from the line sensor 51 are converted into digital signals by a signal-processing circuit. FIG. 5 shows one example of the signal-processing circuit wherein CCDs (Charge Coupled Devices) are used as the light-receiving elements of the line sensor 51.

The signal-processing circuit is provided with an amplification section 52 for amplifying such a minute output from the line sensor 51 to an appropriate level and an A/D (analog/digital) converter 53 for converting a signal from the amplification section 52 into a digital signal.

A lower-limit reference voltage (Vref−), which is used in the A/D converter 53, is obtained by converting data from a black-correction-value storing section 54 into analog signals by using a D/A (digital/analog) converter 55, and an upper-limit reference voltage (Vref+), which is also used in the A/D converter 53, is obtained by converting data from a white-correction-value storing section 56 into analog signals by using a D/A (digital/analog) converter 57.

Here, the black-correction-value storing section 54 stores output voltage values (output voltages in the dark state) from the CCDs as its data that are obtained when no light illuminates the line sensor 51, and the white-correction-value storing section 56 stores output voltage values (output voltages in the bright state) from the CCDs as its data that are obtained when light reflected from a white plate illuminates the line sensor 51.

As one example of the A/D converter 53, FIG. 6 shows a basic construction of a flash-type A/D converter which is capable of providing high-speed conversion that is suitable for the line sensor 51 consisting of CCDs.

In the flash-type A/D converter, voltages, which are obtained by dividing the potential difference between the reference voltages Vref+ and Vref− by using resistors 61, are compared with input signals (Vin) by using comparators 62. Then, an encoder 64 processes the outputs from the comparators 62 by means of AND circuits 63, thereby providing digital outputs.

In the above-mentioned conventional arrangement, however, it is necessary to install an A/D converter 53 with high resolution in order to read an original document 50 such as a photograph with high accuracy. Consequently, the problem is that the cost of the signal-processing circuit tends to become expensive.

Moreover, as the resolution of the A/D converter 53 is improved, the input capacity increases because of an increased degree of integration; this makes it difficult to operate the A/D converter 53 at high frequencies. Furthermore, it is necessary to provide a trimming process in order to increase accuracy of resistances of the resistors 61 that divide the potential difference between the reference values Vref+ and Vref−. For this reason, it is actually very difficult to realize a resolution of more than 10 bits.

In order to solve these problems, Japanese Laid-Open Patent Application No. 108867/1991 (Tokukaihei 3-108867) discloses an image-reading apparatus wherein signals, accumulated in the image sensor, are read out a plurality of times in a divided manner. In other words, a plurality of divided areas are provided between the white-correction value and the black-correction value; the upper limit and the lower limit of each area are defined as Vref+ and Vref− respectively; and an analog-to-digital conversion is carried out for each area. With this arrangement, it is possible to realize an analog-to-digital conversion with high resolution even in the case of using A/D converters having inferior resolution.

In this apparatus, however, for example, when the analog-to-digital conversion having a resolution of 8 bits is carried out by using A/D converters having a resolution of 6 bits, the signals accumulated in the image sensor have to be read out four times. This causes a new problem in that time required for inputting images is lengthened.

SUMMARY OF THE INVENTION

It is an objective of the present invention to provide a signal-processing circuit which is capable of converting analog voltages sent from the line sensor into digital data with high resolution at high speeds and releasing the data.

In order to achieve the above-mentioned object, the signal-processing circuit of the present invention is provided with: the first and second A/D converters for converting analog voltages from a line sensor into digital data; the first reference-voltage setting means for setting a lower-limit reference voltage and an upper-limit reference voltage for the first A/D converter; a data-storing section for storing digital data obtained by the first A/D converter; and the second reference-voltage setting means for setting a lower-limit reference voltage for the second A/D converter to a voltage that is lower than the voltage corresponding to the digital data stored in the data-storing section and that is higher than the lower-limit reference voltage set by the first reference-voltage setting means, as well as for setting a upper-limit reference voltage for the second A/D converter to a voltage that is higher than the voltage corresponding to the digital data stored in the data-storing section and that is lower than the upper-limit reference voltage set by the first reference-voltage setting means. Thus, the signal-processing circuit is characterized in that the digital data is released based on the data obtained by the second A/D converter.

In accordance with the above-mentioned arrangement, the first reference-voltage setting means sets the lower-limit reference voltage and the upper-limit reference voltage for the first A/D converter. Under these settings, the first A/D converter is allowed to convert analog voltages from the line sensor into digital data. The data-storing section stores the digital data. The second reference-voltage setting means sets the lower-limit reference voltage for the second A/D converter to a voltage that is lower than the voltage corresponding to the digital data stored in the data-storing section and that is higher than the lower-limit reference voltage set by the first reference-voltage setting means, and also sets the upper-limit reference voltage for the second A/D converter to a voltage that is higher than the voltage corresponding to the digital data stored in the data-storing section and that is lower than the upper-limit reference voltage set by the first reference-voltage setting means. Therefore, the voltage range from the lower-limit reference voltage to the upper-limit reference voltage in the second A/D converter is smaller than the corresponding voltage range in the first A/D converter. Under these settings, the second A/D converter converts analog voltages from the line sensor into digital data. For this reason, even if A/D converters having the same resolution are used as the first and second A/D converters, it is possible to provide a higher resolution in the second A/D converter than in the first A/D converter. This makes it possible to realize a signal-processing circuit with high resolution at low costs. Moreover, it is possible to achieve a high-speed processing since the reading operation is carried out with high resolution only in the vicinity of the voltage corresponding to the digital data.

For a fuller understanding of the nature and advantages of the invention, reference should be made to the ensuing detailed description taken in conjunction with the accompanying drawings.

DESCRIPTION OF THE EMBODIMENTS

Figure 1:
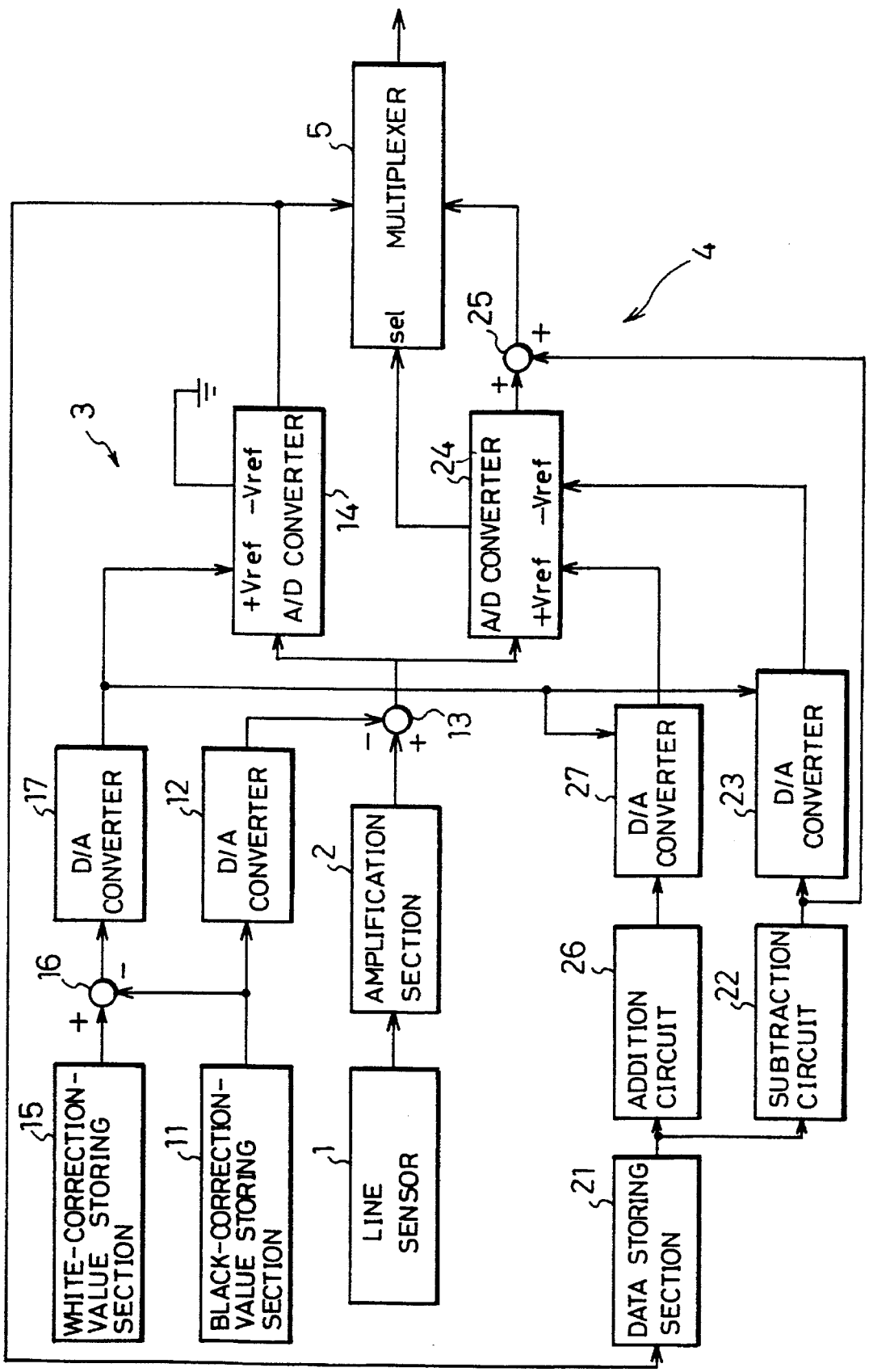
FIG. 1 which shows one embodiment of the present invention, is a block diagram showing a schematic construction of a signal-processing circuit.
Figure 2:
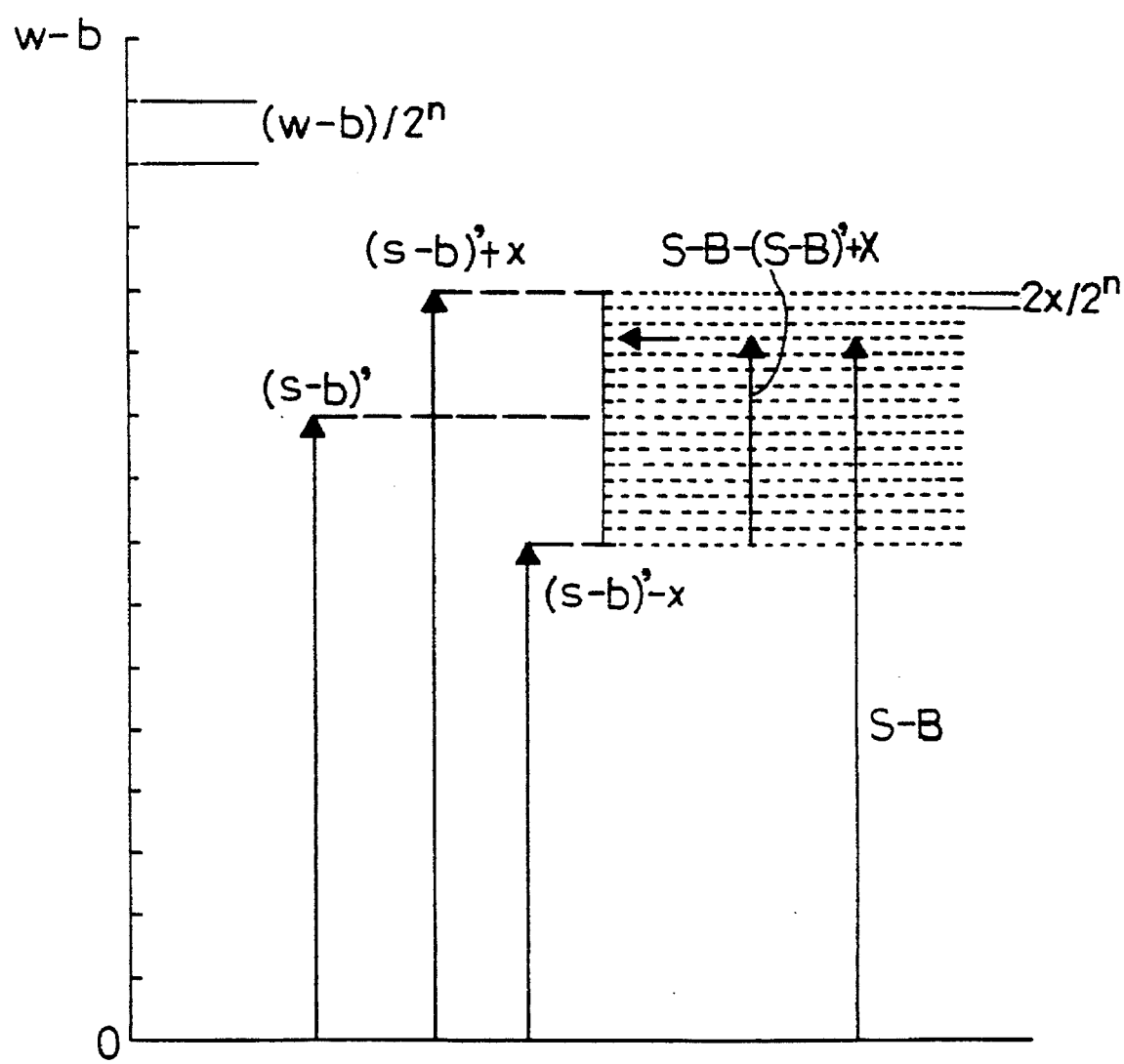
FIG. 2 is an explanatory drawing that shows an operation of the signal-processing circuit of FIG. 1.

Referring to FIG. 1 and FIG. 2, the following description will discuss one embodiment of the present invention.

As shown in FIG. 1, the signal-processing circuit of the present embodiment is provided with: an amplification section 2 for amplifying a minute output from a line sensor 1, an A/D conversion system 3 for converting a signal from the amplification section 2 into a digital signal, an A/D conversion system 4 for converting the signal from the amplification section 2 into a digital signal with a resolution higher than that in the A/D conversion system 3, and a multiplexer 5 that allows the A/D conversion system 4 to release the digital signal when there is no error in the A/D conversion system 4 and that allows the A/D conversion system 3 to release the digital signal in the event of an error in the A/D conversion system 4.

The A/D conversion system 3 is provided with: a black-correction value storing section 11, a D/A converter 12 for digital-to-analog converting data from the black-correction value storing section 11, an analog subtraction circuit 13 for subtracting an output signal from the D/A converter 12 from an output signal of the amplification section 2, and an A/D converter 14 (the first A/D converter) for analog-to-digital converting a signal from the analog subtraction circuit 13.

The result of the analog-to-digital conversion, obtained from the A/D converter 14, is written to a data-storing section 21, which will be described later, and the result of the analog-to-digital conversion corresponding to one-line portion, stored in the data-storing section 21, is utilized in an analog-to-digital conversion for the next line.

The A/D conversion system 3 is further provided with: a white-correction value storing section 15, a digital subtraction circuit 16 for subtracting data from the black-correction value storing section 11 from data from the white-correction value storing section 15, and a D/A converter 17 for digital-to-analog converting an output signal from the digital subtraction circuit 16.

The lower-limit reference voltage (Vref−) of the A/D converter 14 is set to 0 V (ground level), and the upper-limit reference voltage (Vref+) is set to the output voltage from the D/A converter 17.

Here, in the A/D conversion system 3, the black-correction value storing section 11, the white-correction value storing section 15, the digital subtraction circuit 16 and the D/A converter 17 constitute the first reference-voltage setting means.

The A/D conversion system 4 is provided with: a data-storing section 21 for storing the result of an analog-to-digital conversion obtained from a line immediately before the line currently being read by the line sensor 1, a subtraction circuit 22 for subtracting a value X (which will be described later) from data from the data-storing section 21, a D/A converter 23 for digital-to-analog converting an output from the subtraction circuit 22, an A/D converter 24 (second A/D converter) for analog-to-digital converting an output signal from the analog subtraction circuit 13 in the A/D conversion system 3, and a digital addition circuit 25 for adding the output signal from the A/D converter 24 and the output signal from the subtraction circuit 22.

The A/D converter 24 releases an error signal in the event of an error, and the error signal is inputted to a select terminal of the multiplexer 5.

The A/D conversion system 4 is further provided with an addition circuit 26 for adding the value X to data from the data-storing section 21 and a D/A converter 27 for digital-to-analog converting an output signal from the addition circuit 26.

The lower-limit reference voltage (Vref−) of the A/D converter 24 is set to the output voltage of the D/A converter 23, and the upper-limit reference voltage (Vref+) is set to the output voltage of the D/A converter 27.

Here, in the A/D conversion system 4, the subtraction circuit 22, the D/A converter 23, the addition circuit 26, and the D/A converter 27 constitute the second reference-voltage setting means.

Moreover, an output signal from the D/A converter 17 in the A/D conversion system 3 is inputted to the reference inputs (ref) of the D/A converters 23 and 27.

In the above-mentioned arrangement, the signal from the line sensor 1 is amplified by the amplification section 2, and the resulting output signal from the amplification section 2 is inputted to the analog subtraction circuit 13. In the analog subtraction circuit 13, the output signal from the D/A converter 12 is subtracted from the output signal from the amplification section 2. Then, the output signal from the analog subtraction circuit 13 is inputted to the A/D converter 14 in the A/D conversion system 3 as well as to the A/D converter 24 in the A/D conversion system 4, where the analog-to-digital conversion is carried out.

When the output signal from the amplification section 2 is defined as s and the data from the black-correction value storing section 11 is defined as B, the signal to be inputted to the A/D converters 14 and 24 is represented by s–b. Here, b is an analog value corresponding to B. Similarly, in the following description, digital data is represented by a capital English letter, and the corresponding analog value is represented by the corresponding small English letter.

Supposing that data from the white-correction value storing section 15 is W, in the A/D converter 14, Vref+=w–b and Vref–=0 hold.

Therefore, the output from the A/D conversion system 3, that is, the output from the A/D converter 14 is represented by S–B–0=S–B, and the resolution is represented by $(w-b)/2^n$ in the case of the A/D converter 14 with n bits.

Supposing that the result of analog-to-digital conversion in the preceding line, stored in the data-storing section 21, is (S–B)'Vref+=(s–b)'+x, as well as Vref–=(s–b)'–x, holds in the A/D converter 24, as shown in FIG. 2. Similarly, in the following description, the prime symbol (') indicates the result of analog-to-digital conversion in the line immediately before a line currently being read by the line sensor 1.

Therefore, the output of the A/D converter 24 is represented by S–B–(S–B)'+X, and the resolution is $2x/2^n$ in the case of the A/D converter 24 with n bits. Thus, the output of the A/D conversion system 4, that is, the output of the digital addition circuit 25, is represented by S–B, and the resolution is $2x/2^n$.

Here, when there is a correlation between a line currently being read by the line sensor 1 and the preceding line, it is possible to set the value X to a value that satisfies (S–B)'–X <S–B <(S–B)'+X and that is substantially smaller than S–B. In this case, the resolution of the A/D conversion system 4, $2f/2^n$, becomes substantially smaller than the resolution of the A/D conversion system 3, $(w-b)/2^n$. In other words, even if A/D converters 14 and 24 having the same resolution of n bits are used, it is possible to obtain a result of analog-to-digital conversion with higher resolution in the A/D conversion system 4 than in the A/D conversion system 3.

This makes it possible to realize a signal-processing circuit with high resolution at low costs. Moreover, since the reading operation is carried out only within a narrow voltage range from (s–b)'+x to (s–b)'–x, it becomes possible to provide a high-speed processing.

Here, in the case when a line currently being read is pure-white and the preceding line is deep-black, that is, in the case when there is hardly any correlation between the two lines, it is sometimes not possible to satisfy (S –B)'–X<S–B<(S–B)'+X. In this case, the A/D converter 24 has an overflow or an underflow, and fails to provide a correct result of analog-to-digital conversion.

However, in the signal-processing circuit of the present embodiment, even if the A/D converter 24 has an overflow or an underflow, the multiplexer 5 selects the result of analog-to-digital conversion in the A/D conversion system 3, and outputs the selected result. Thus, it is possible to obtain the result of analog-to-digital conversion with normal resolution, that is, with the resolution of $(w-b)/2^n$, even when there is hardly any correlation between the two lines.

Moreover, the A/D converter 24, when it has an overflow or an underflow, sends an error signal to the multiplexer 5 not for each line, but for each pixel on the line; therefore, the multiplexer 5 selects either the result of analog-to-digital conversion of the A/D conversion system 3, or the result of analog-to-digital conversion of the A/D conversion system 4 for each pixel, and outputs the selected result. This arrangement makes it possible to obtain a result of analog-to-digital conversion with high resolution for almost all pixels in the case of normal images that seldom have abrupt changes in contrast.

Furthermore, in the present embodiment, the output of the D/A converter 17 in the A/D conversion system 3, that is, w–b, is inputted to the reference inputs (ref) of the D/A converters 23 and 27; this allows the D/A converters 23 and 27 to always execute digital-to-analog conversions over all the range of W–B.

In the above-mentioned embodiment, the result of analog-to-digital conversion in the line immediately before a line currently being read is stored in the data-storing section 21; however, this is not necessarily limited to the line immediately before a line currently being read, and a result of analog-to-digital conversion in any pixel may be stored in the data-storing section 21, as long as it is a pixel portion located in the vicinity of a pixel currently being read.

More specifically, in the above-mentioned signal-processing circuit, if it is intended to obtain the result of analog-to-digital conversion with a resolution of 10 bits by using, for example, the A/D converters 14 and 24 with a resolution of 8 bits, the value X is determined so as to satisfy the following equation.

$$2x/2^8 = (w-b)/2^{10}$$
$$= r/4$$

Here, r represents the resolution of the A/D converter 14, that is, $(w-b)/2^8$. Therefore, X is determined so as to satisfy the following equation.

$$x=(2^8/2\times 4)r=32r$$

Additionally, the data to be stored in the data-storing section 21 are only regarded as reference values to set the input range of the A/D converter 24. Therefore, in this example, 8 bits provide a sufficient accuracy. In the case of the data with 8 bits, in order to expand the output of the data-storing section 21 to 10 bits, 2 bits are added to low order position, and these are set to 0. The same is also true in the case of the output of the A/D converter 14.

Figure 3:
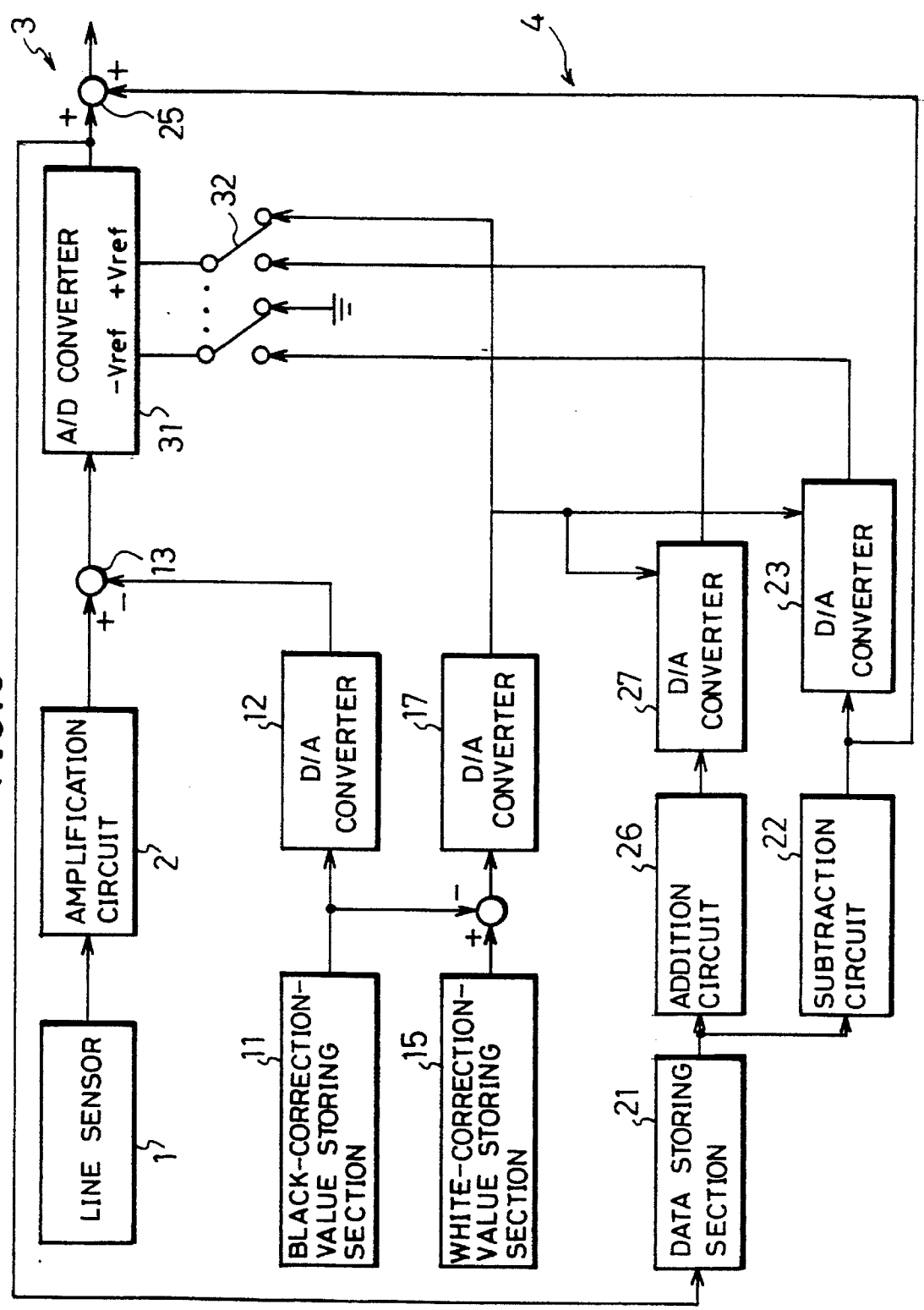
FIG. 3 which shows another embodiment of the present invention, is a block diagram showing a schematic construction of a signal-processing circuit.
Figure 4:
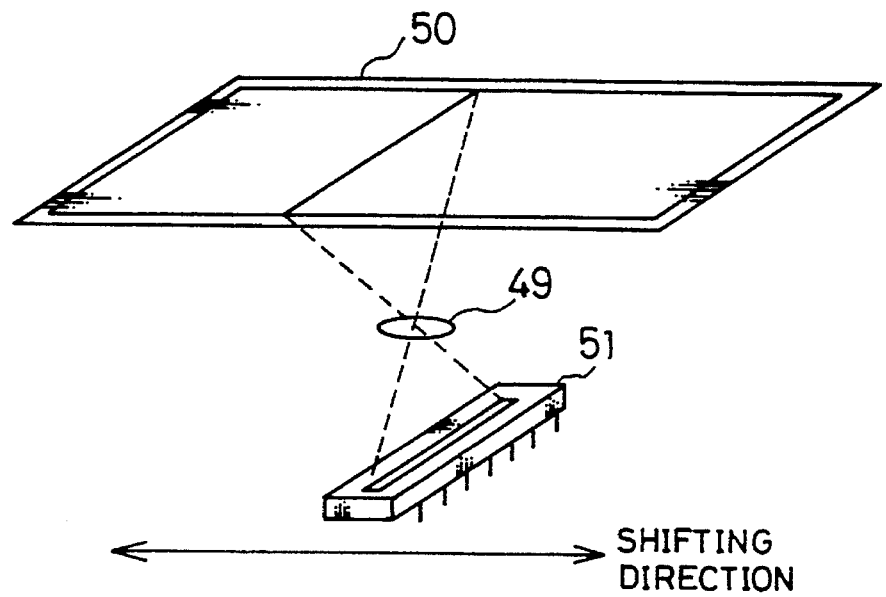
FIG. 4 is an explanatory drawing that shows a conventional image-inputting apparatus.
Figure 5:
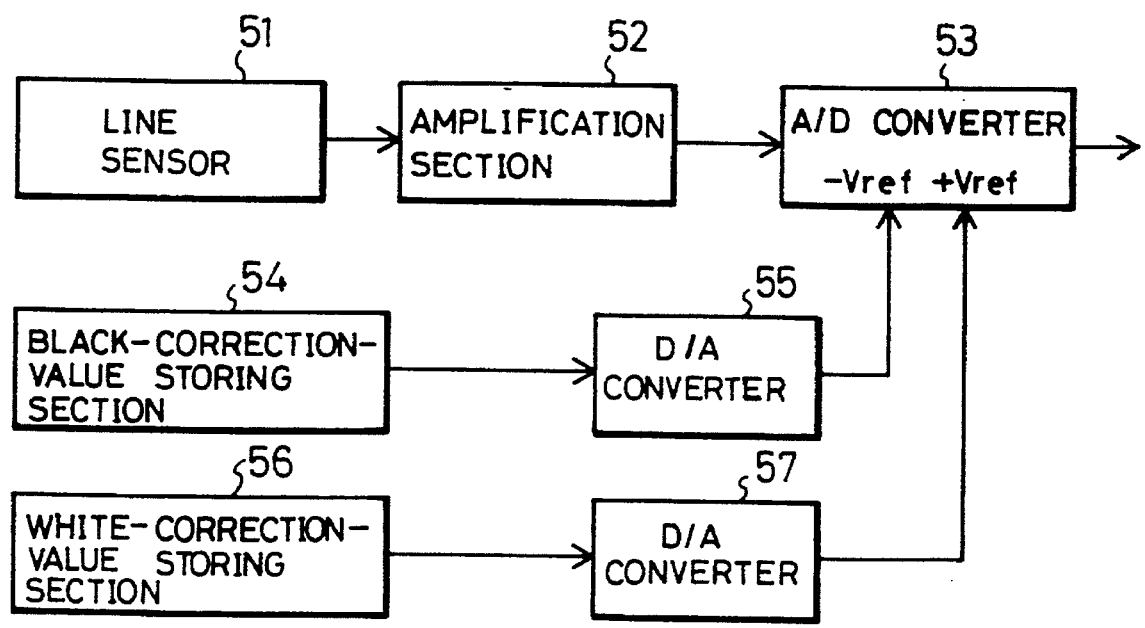
FIG. 5 is a block diagram showing a schematic construction of a signal-processing circuit for use in the image-inputting apparatus of FIG. 4.
Figure 6:
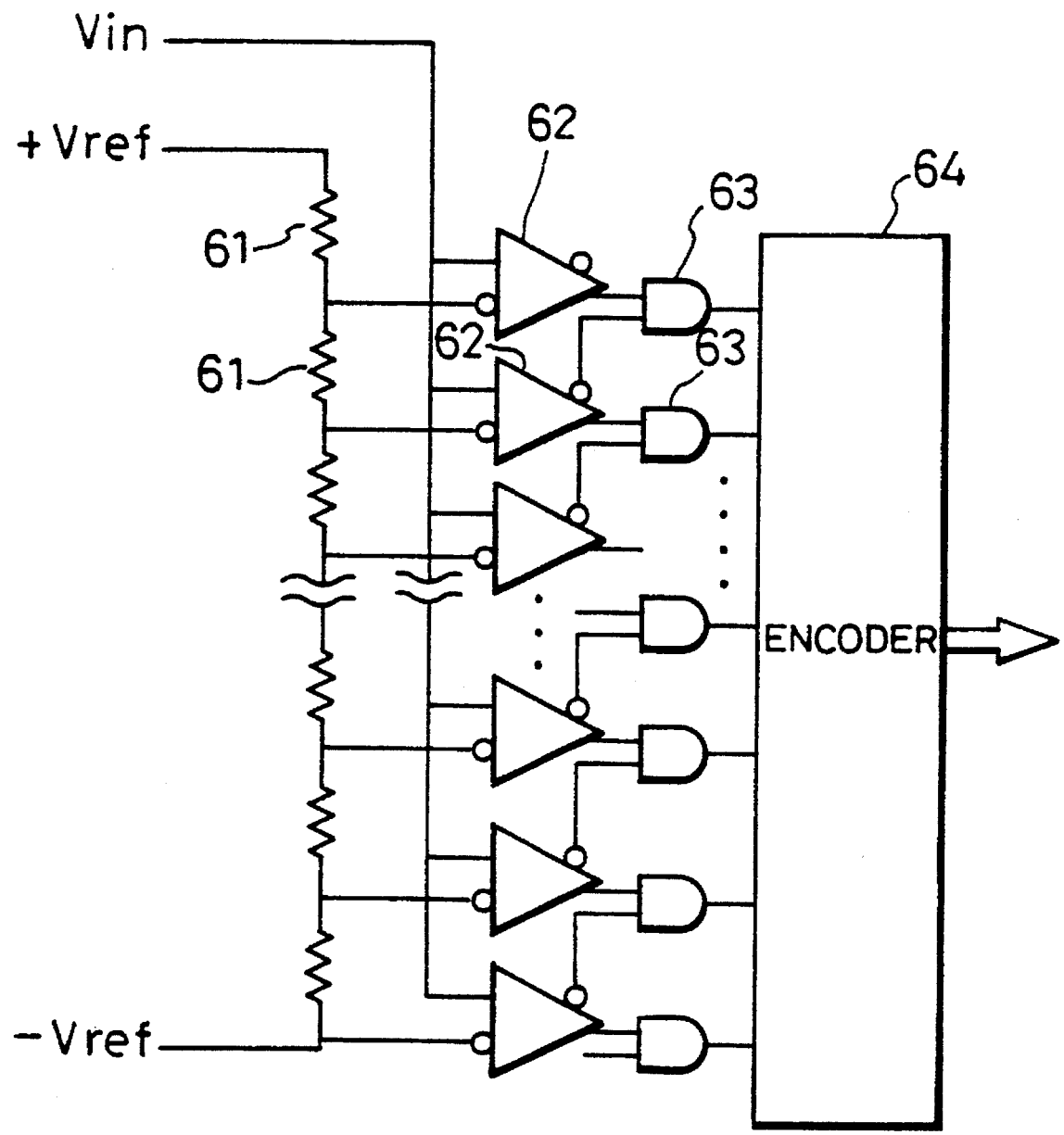
FIG. 6, which shows one example of an A/D converter in the signal-processing circuit of FIG. 5, is a block diagram showing a schematic construction of a flash-type A/D converter.

Referring to FIG. 3, the following description will discuss another embodiment of the present invention. Here, for convenience of explanation, those members that have the same functions and that are described in the aforementioned embodiment by reference to its drawings are indicated by the same reference numerals and the description thereof is omitted.

The signal-processing circuit of the present embodiment is different from that of the aforementioned embodiment in that an A/D converter 31 (the first and second A/D converters), which is commonly used in the A/D conversion system 3 as well as in the A/D conversion system 4, is installed instead of the A/D converters 14 and 24, and in that a switching circuit 32 for switching voltages to be applied to the Vref+ and Vref– of the A/D converter 31 is installed. Here, this change makes the multiplexer 5 unnecessary.

In the above-mentioned arrangement, the signal from the line sensor 1 is amplified by the amplification section 2, and the output signal from the amplification section 2 is inputted to the analog subtraction circuit 13. In the analog subtraction circuit 13, the output signal from the D/A converter 12 is subtracted from the output signal from the amplification section 2. Then, the output signal from the analog subtraction circuit 13 is inputted to the A/D converter 31, where an analog-to-digital conversion having a normal resolution is conducted on one line by the A/D conversion system 3 and then an analog-to-digital conversion having a high resolution is conducted on the same line by the A/D conversion system 4.

When the analog-to-digital conversion is conducted by the A/D conversion system 3, the switching circuit 32 is switched to the A/D conversion system 3 side by a control means (not shown). Thus, the Vref+ and Vref− of the A/D converter 31 are respectively set to the output voltage (that is, w−b) from the D/A converter 17 and 0 V (that is, ground level), in the same manner as in the aforementioned embodiment.

Therefore, the output of the A/D conversion system 3, that is, the output of the A/D converter 31, is represented by S−B in the same manner as in the aforementioned embodiment, and its resolution is $(w-b)/2^n$ in the case of the A/D converter 31 with n bits.

The result of this analog-to-digital conversion is written to the data-storing section 21, and is read from the data-storing section 21 when the analog-to-digital conversion is conducted by the A/D conversion system 4.

When the analog-to-digital conversion is conducted by the A/D conversion system 4, the switching circuit 32 is switched to the A/D conversion system 4 side by the control means. Thus, the Vref+ and Vref− of the A/D converter 31 are respectively set to the output voltage (that is, (s−b)'+x) from the D/A converter 27 and the output voltage (that is, (s−b)'−x) from the D/A converter 23, in the same manner as in the aforementioned embodiment. Here, the prime symbol (') represents the result of analog-to-digital conversion conducted by the A/D conversion system 3.

Therefore, the output of the A/D converter 31 is represented by S−B−(S−B)'+X, in the same manner as in the aforementioned embodiment, and its resolution is $2x/2^n$ in the case of the A/D converter 31 with n bits. Thus, the output of the A/D conversion system 4, that is, the output of the digital addition circuit 25 is represented by S−B, and its resolution is $2x/2^n$.

Here, since the A/D conversion systems 3 and 4 conduct analog-to-digital conversions on the same line, it is possible to set the value X to a value that always satisfies (S−B)'−X<S−B<(S−B)'+X and that is smaller than S−B. Therefore, the resolution of the A/D conversion system 4, $2x/2^n$, is substantially smaller than the resolution of the A/D conversion system 3, $(w-b)/2^n$. In other words, even if the A/D converters 14 and 24 having the same resolution of n bits are used, the A/D conversion system 4 provides a result of analog-to-digital conversion having a higher resolution than the A/D conversion system 3.

Moreover, it becomes possible to set the value X to a value that is much smaller than that in the aforementioned embodiment; this makes it possible to achieve a higher resolution than that in the aforementioned embodiment.

Furthermore, in this arrangement the A/D converter 31 is commonly used in the A/D conversion system 3 as well as in the A/D conversion system 4; this makes it possible to reduce the cost of the signal-processing circuit more than the aforementioned embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A signal-processing circuit, which converts an analog voltage that has been obtained by reading an original document by using a line sensor consisting of a plurality of light-receiving elements that are linearly aligned into digital data and releases the digital data, comprising:

first and second A/D converters for converting the analog voltage into digital data;

a first reference-voltage setting means for setting a lower-limit reference voltage and an upper-limit reference voltage for the first A/D converter;

a data-storing section for storing the digital data obtained by the first A/D converter; and a second reference-voltage setting means for setting a lower-limit reference voltage for the second A/D converter to a voltage that is lower than the voltage corresponding to the digital data stored in the data-storing section and that is higher than the lower-limit reference voltage set by the first reference-voltage setting means, as well as for setting an upper-limit reference voltage for the second A/D converter to a voltage that is higher than the voltage corresponding to the digital data stored in the data-storing section and that is lower than the upper-limit reference voltage set by the first reference-voltage setting means, wherein the digital data is released based on the data obtained by the second A/D converter.

2. The signal-processing circuit as defined in claim 1, further comprising a multiplexer which selects digital data obtained from the first A/D converter in the event of an error in the second A/D converter and releases the digital data.

3. The signal-processing circuit as defined in claim 2, wherein the second reference-voltage setting means comprises:

an addition circuit for adding a value that is smaller than one-half of the difference between the upper-limit reference voltage and the lower-limit reference voltage for the first A/D converter to digital data stored in the data-storing section and for outputting the resulting data;

a first D/A converter for converting the output from the addition circuit into an analog voltage and for outputting the analog voltage as the upper-limit reference voltage for the second A/D converter;

a subtraction circuit for subtracting the value from the digital data stored in the data-storing section and for outputting the resulting value; and a second D/A converter for converting the output from the subtraction circuit into an analog voltage and for outputting the analog voltage as the lower-limit reference voltage for the second A/D converter.

4. The signal-processing circuit as defined in claim 1, wherein an A/D converter is used as the first and second A/D converters in a shared manner and a switching circuit for switching the lower-limit reference voltage and the upper-limit reference voltage for the A/D converter to voltages that are set by the first reference-voltage setting means or the second reference-voltage setting means.

5. The signal-processing circuit as defined in claim 4, wherein the second reference-voltage setting means comprises:

an addition circuit for adding a value that is smaller than one-half of the difference between the upper-limit reference voltage and the lower-limit reference voltage for the first A/D converter to digital data stored in the data-storing section and for outputting the resulting data;

a first D/A converter for converting the output from the addition circuit into an analog voltage and for outputting the analog voltage as the upper-limit reference voltage for the second A/D converter;

a subtraction circuit for subtracting the value from the digital data stored in the data-storing section and for outputting the resulting value; and a second D/A converter for converting the output from the subtraction circuit into an analog voltage and for outputting the analog voltage as the lower-limit reference voltage for the second A/D converter.

6. The signal-processing circuit as defined in claim 1, wherein the second reference-voltage setting means comprises:

an addition circuit for adding a value that is smaller than one-half of the difference between the upper-limit reference voltage and the lower-limit reference voltage for the first A/D converter to digital data stored in the data-storing section and for outputting the resulting data;

a first D/A converter for converting the output from the addition circuit into an analog voltage and for outputting the analog voltage as the upper-limit reference voltage for the second A/D converter;

a subtraction circuit for subtracting the value from the digital data stored in the data-storing section and for outputting the resulting value; and a second D/A converter for converting the output from the subtraction circuit into an analog voltage and for outputting the analog voltage as the lower-limit reference voltage for the second A/D converter.

* * * * *